United States Patent
Hao et al.

(10) Patent No.: US 10,152,165 B2
(45) Date of Patent: Dec. 11, 2018

(54) TOUCH PANEL CIRCUIT WITH ELECTROSTATIC DISCHARGE PROTECTION STRUCTURE AND TOUCH PANEL INCLUDING SAME

(71) Applicant: Xiaomi Inc., Beijing (CN)

(72) Inventors: Ning Hao, Beijing (CN); Qinghui Zhao, Beijing (CN); Yanteng Wang, Beijing (CN)

(73) Assignee: Xiaomi Inc., Beijing (CN)

( * ) Notice: Subject to any disclaimer, the term of this patent is extended or adjusted under 35 U.S.C. 154(b) by 207 days.

(21) Appl. No.: 15/074,969

(22) Filed: Mar. 18, 2016

(65) Prior Publication Data
US 2016/0283027 A1    Sep. 29, 2016

(30) Foreign Application Priority Data

Mar. 23, 2015 (CN) .......................... 2015 1 0127724

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 2203/04103* (2013.01); *G06F 2203/04107* (2013.01)

(58) Field of Classification Search
CPC .................. G06F 3/0416; G06F 3/044; G06F 2203/04103; G06F 2203/04107
See application file for complete search history.

(56) References Cited

U.S. PATENT DOCUMENTS

2008/0179112 A1   7/2008  Qin et al.
2008/0309633 A1  12/2008  Hotelling et al.
(Continued)

FOREIGN PATENT DOCUMENTS

| CN | 101578006 A | 11/2009 |
|---|---|---|
| CN | 101604218 A | 12/2009 |
| CN | 101655755 A | 2/2010 |

(Continued)

OTHER PUBLICATIONS

International Search Report of PCT Application No. PCT/CN2015/093046, from the State Intellectual Property Office of China, dated Feb. 2, 2016 (4 pages).

(Continued)

*Primary Examiner* — Robert Michaud
(74) *Attorney, Agent, or Firm* — Finnegan, Henderson, Farabow, Garrett & Dunner LLP

(57) ABSTRACT

A touch panel circuit is disclosed. The touch panel circuit includes a signal transmission path and a ground path. An end of the signal transmission path is provided with a first tip structure protruding outward and having a needlepoint-shape end portion. The ground path is provided with a second tip structure having a needlepoint-shape end portion which is opposite to the needlepoint-shape end portion of the first tip structure. The needlepoint-shape end portion of the first tip structure of the signal transmission path is configured to aggregate electrostatic charges on the signal transmission path, and discharge the aggregated electrostatic charges to the second tip structure of the ground path opposite to the first tip structure.

15 Claims, 3 Drawing Sheets

(56) References Cited

U.S. PATENT DOCUMENTS

2009/0262094 A1* 10/2009 Lin .................... G06F 3/045
                                                    345/174
2011/0057887 A1*  3/2011 Lin .................... G06F 3/044
                                                    345/173

FOREIGN PATENT DOCUMENTS

| CN | 102541339 A  | 7/2012  |
|----|--------------|---------|
| CN | 102799313 A  | 11/2012 |
| CN | 203376735 U  | 1/2014  |
| CN | 203552224 U  | 4/2014  |
| CN | 103902092 A  | 7/2014  |
| CN | 104765490 A  | 7/2015  |
| JP | 2015210554 A | 11/2015 |
| RU | 2498390 C2   | 11/2013 |

OTHER PUBLICATIONS

Office Action in counterpart Russian Application No. 2015156684/08, dated Apr. 7, 2017.
Extended Search Report for European Application No. 16160710.6 from the European Patent Office, dated Jul. 27, 2016.
English version of International Search Report of PCT Application No. PCT/CN2015/093046, dated Feb. 2, 2016, issued by the ISA/CN—State Intellectual Property Office of the P.R. China.

* cited by examiner

TOUCH PANEL CIRCUIT WITH ELECTROSTATIC DISCHARGE PROTECTION STRUCTURE AND TOUCH PANEL INCLUDING SAME

CROSS-REFERENCE TO RELATED APPLICATIONS

This application is based upon and claims priority to Chinese Patent Application 201510127724.7, filed Mar. 23, 2015, the entire contents of which are incorporated herein by reference.

TECHNICAL FIELD

The present disclosure relates to the field of manufacturing electronic equipment, and more particularly, to a touch panel circuit with an electrostatic discharge protection structure and a touch panel including the touch panel circuit.

BACKGROUND

Conventionally, touch panels are mostly made of ITO (Indium Tin Oxide) material. However, the anti-electrostatic discharge capacity of a touch panel made of ITO material is relatively weak. Thus, there is a need to prevent the electrostatic discharge from damaging the ITO touch panel.

Currently, the solution is to add an electrostatic discharge protection device at a connector of the touch panel so as to keep the electronic charges out of the touch panel.

SUMMARY

According to a first aspect of the present disclosure, there is provided a touch panel circuit. The touch panel circuit includes a signal transmission path and a ground path. An end of the signal transmission path is provided with a first tip structure protruding outward and having a needlepoint-shape end portion. The ground path is provided with a second tip structure having a needlepoint-shape end portion which is opposite to the needlepoint-shape end portion of the first tip structure. The needlepoint-shape end portion of the first tip structure of the signal transmission path is configured to aggregate electrostatic charges on the signal transmission path, and discharge the aggregated electrostatic charges to the second tip structure of the ground path opposite to the first tip structure.

According to another aspect of the present disclosure, there is provided a touch panel. The touch panel includes a touch panel circuit, which includes a signal transmission path and a ground path. An end of the signal transmission path is provided with a first tip structure protruding outward and having a needlepoint-shape end portion. The ground path is provided with a second tip structure having a needlepoint-shape end portion which is opposite to the needlepoint-shape end portion of the first tip structure. The needlepoint-shape end portion of the first tip structure of the signal transmission path is configured to aggregate electrostatic charges on the signal transmission path, and discharge the aggregated electrostatic charges to the second tip structure of the ground path opposite to the first tip structure.

According to another aspect of the present disclosure, there is provided a device. The device includes a touch panel control chip and a touch panel including a touch panel circuit that further includes a signal transmission path and a ground path. An end of the signal transmission path is provided with a first tip structure protruding outward and having a needle-point-shape end portion. The ground path is provided with a second tip structure having a needlepoint-shape end portion which is opposite to the needlepoint-shape end portion of the first tip structure. The needlepoint-shape end portion of the first tip structure of the signal transmission path is configured to aggregate electrostatic charges on the signal transmission path, and discharge the aggregated electrostatic charges to the second tip structure of the ground path opposite to the first tip structure.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1A:
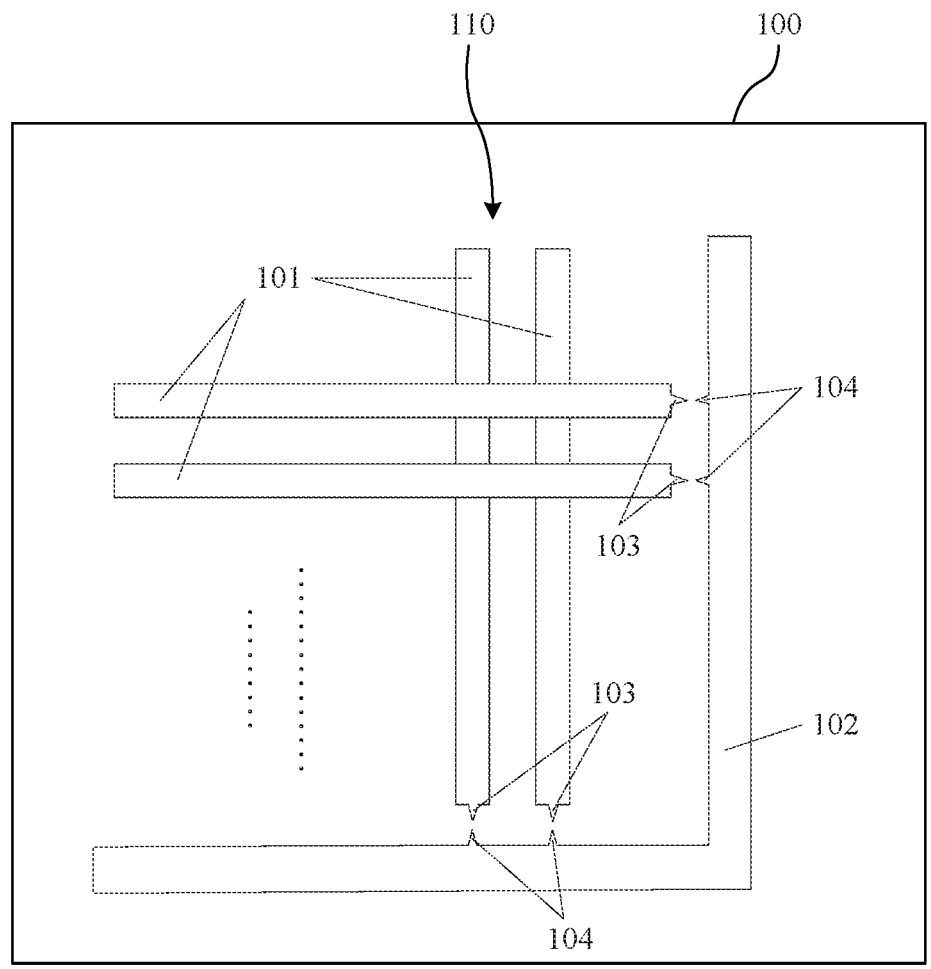
FIG. 1A is a schematic structural diagram showing a touch panel circuit having an electrostatic discharge protection structure, according to an exemplary embodiment of the present disclosure.

FIG. 1A is a schematic structural diagram showing a touch panel 100 having a touch panel circuit 110 including an electrostatic discharge protection structure, according to an exemplary embodiment of the present disclosure. As shown in FIG. 1A, the touch panel circuit 110 includes one or more signal transmission paths 101 and a ground path 102.

An end of each of the signal transmission paths 101 is provided with a first tip structure 103 protruding outward and having a needlepoint-shape end portion.

The ground path 102 is provided with a plurality of second tip structures 104 having a needlepoint-shape end portion which are opposite to the needlepoint-shape end portion of the first tip structures 103.

The first tip structures 103 and the second tip structures 104 may be a triangle-shaped structure or other shaped structures having a needlepoint-shape end portion. Each of the first tip structures 103 is located at the end of a signal transmission path 101. The second tip structures 104 protrude from the ground path 102. The needlepoint-shape end portions of a first tip structure 103 and a second tip structure 104 are disposed opposite to each other, and constitute a tip group for discharging electrostatic charges. A tip group is provided between each signal transmission path 101 and ground path 102. In the embodiment, the number of the first tip structure 103 and the number of the second tip structure 104 in the touch panel circuit are equal.

In some embodiments, the touch panel circuit 110 may include one, two, or more than two signal transmission paths 101, and one, two, or more than two ground paths 102. The number of the signal transmission paths 101 and the number of the ground paths 102 are not limited in the embodiments.

In one group of the opposite first tip structure 103 and second tip structure 104, the needlepoint-shape end portions of the first tip structure 103 and the second tip structure 104 point to each other.

In some embodiments, the first tip structure 103 may also be disposed at other locations on a signal transmission path 101, which is not limited by the present embodiment.

It can be known from the theory of potential distribution of an electrostatic field that a charge density in the electrostatic field is inversely proportional to a radius R, i.e., is proportional to a curvature. Thus, the electric charges are generally aggregated at a position having a relatively larger curvature. Thereby, in a circuit path in the touch panel circuit, the curvature of the tip structure having a needlepoint-shape end portion is relatively large, and thus more electrostatic charges are aggregated at such tip structure.

In the illustrated embodiments, a first tip structure 103 provided at an end of a signal transmission path 101 protrudes outward and has a needlepoint-shape end portion, so that it can aggregate electrostatic charges on the signal transmission path 101. A second tip structure 104 on the ground path 102 protrudes outward and has a needlepoint-shape end portion, so that it can receive the electrostatic charges. Moreover, since the curvatures of the needlepoint-shape end portions of the first tip structure 103 and the second tip structure 104 have a maximum value compared to other portions of the signal transmission path 101 and the ground path 102, the electrostatic charges will aggregate at the needlepoint-shape end portions of the first tip structure 103 and the second tip structure 104.

The needlepoint-shape end portion of the first tip structure 103 on the signal transmission path 101 is configured to aggregate electrostatic charges on the signal transmission path 101, and discharge the aggregated electrostatic charges to the second tip structure 104 on the ground path 102 opposite to the first tip structure 103.

The needlepoint-shape end portion of the first tip structure 103 on the signal transmission path 101 is opposite to the needlepoint-shape op end portion of the second tip structure 104 on the ground path 102. When a number of electrostatic charges are aggregated at the needlepoint-shape end portion of the first tip structure 103, a potential at the needlepoint-shape end portion of the first tip structure 103 is higher than that at the needlepoint-shape end portion of the second tip structure 104. Thus, the electrostatic charges aggregated at the needlepoint-shape end portion of the first tip structure 103 are discharged to the needlepoint-shape end portion of the second tip structure 104.

Figure 1B:
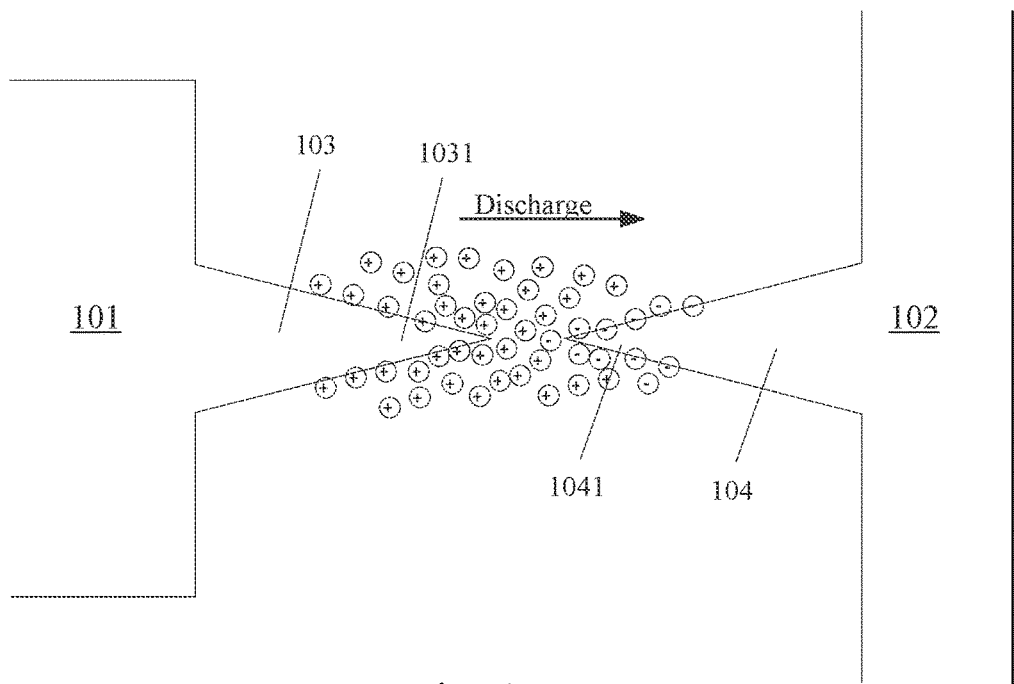
FIG. 1B is a schematic diagram showing that electrostatic charges at a first tip structure are discharged to a second tip structure, according to an exemplary embodiment of the present disclosure.

For instance, FIG. 1B is schematic diagram showing that electrostatic charges at a first tip structure 103 are discharged to a second tip structure 102, according to an exemplary embodiment. As shown in FIG. 1B, after a large number of electrostatic charges are aggregated at the needlepoint-shape end portion 1031 of the first tip structure 103, a potential at the needlepoint-shape end portion 1031 of the first tip structure 103 becomes higher than that at the needlepoint-shape end 1041 portion of the second tip structure 104. The electrostatic charges aggregated at the needlepoint-shape end portion 1031 of the first tip structure 103 are discharged to the needlepoint-shape end portion 1041 of the second tip structure 104.

The needlepoint-shape end portion 1041 on the second tip structure 104 is configured to receive the electrostatic charges discharged by the needlepoint-shape end portion 1031 of the first tip structure 103, and guide the electrostatic charges to the ground path 102.

After the needlepoint-shape end portion 1041 of the second tip structure 104 on the ground path 102 receives the electrostatic charges discharged by the needlepoint-shape end portion 1031 of the first tip structure 103, a potential at the needlepoint-shape end portion 1041 of the second tip structure 104 is higher than that at other positions on the ground path 102, thereby the electrostatic charges at the needlepoint-shape end portion 1041 of the second tip structure 104 will flow to positions having a low potential on the ground path 102 through the ground path 102.

A distance between the needlepoint-shape end portion 1031 on the first tip structure 103 and the needlepoint-shape end portion 1041 on the second tip structure 104 is smaller than a predetermined distance threshold.

In order to enable the electrostatic charges aggregated at the needlepoint-shape end portion 1031 of the first tip structure 103 to be discharged to the needlepoint-shape end portion 1041 of the second tip structure 104, a distance between the needlepoint-shape end portion 1031 of the first tip structure 103 and the needlepoint-shape end portion 1041 of the second tip structure 104 can be smaller than a predetermined distance threshold.

The ground path 102 is configured to provide a flowing loop for the electrostatic charges received by the second tip structure 104.

When the second tip structure 104 does not receive discharged electrostatic charges, the potential at the second tip structure 104 is substantially equal to those at other positions on the ground path 102. After the second tip structure 104 receives the electrostatic charges discharged by the first tip structure 103, the potential at the second tip structure 104 becomes higher than those at other positions on the ground path 102. At this time, the electrostatic charges at the second tip structure 104 flow to the positions having a lower potential on the ground path 102 through the ground path 102.

The signal transmission path 101 is coupled to a touch panel control chip and a touch panel, and is configured to receive a capacitance value generated on the touch panel and a driving signal of the touch panel control chip.

In the illustrated embodiment, the signal transmission path 101 may be a circuit path receiving a capacitance value or propagating a driving signal.

The circuit path receiving a capacitance value can feed the capacitance value generated on the touch panel to the touch panel control chip. The circuit path propagating the driving signal can carry the driving signal of the touch panel control chip.

In some embodiments, the first tip structure 103 may be formed concurrently when forming the signal transmission path 101 by, for example, a photolithographic process including etching; and the second tip structure 104 may be formed concurrently when forming the ground path 102 by, for example, a photolithographic process including etching.

Since both the first tip structure 103 and the second tip structure 104 may be formed concurrently when forming the touch panel circuit 110 for the touch panel 100, no additional materials need to be added, which saves the manufacturing cost.

In some embodiments, while not affecting the normal functions of the signal transmission path 101, the first tip structure 103 may be formed as small as possible, as long as the first tip structure 103 can aggregate the electrostatic charges.

As explained above, in the touch panel circuit 110 having an electrostatic discharge protection structure provided by the embodiments of the present disclosure, the electrostatic charges are aggregated at the first tip structure 103 at the end of the signal transmission path 101, and the aggregated electrostatic charges are discharged to the second tip structure 104 on the ground path 102 opposite to the first tip structure 103. Thus, the electrostatic charges are discharged to the ground path 102 to reduce any damage of the electrostatic discharge to the touch panel circuit 110. Thus, the touch panel circuit according to the embodiments of this disclosure may solve the problem of the conventional touch panel including an electrostatic discharge protection device that blocks electrostatic discharge from outside of the touch panel by an electrostatic discharge blocking device but may still cause a damage to the touch panel circuit when there are excessive aggregated electrostatic charges.

In some embodiments, a distance between the needlepoint-shape end portion 1031 of the first tip structure 103 and the needlepoint-shape end portion 1041 of the second tip structure 104 is set to be smaller than a predetermined distance threshold. Such a configuration solves the problem that the electrostatic charges cannot be discharged when the distance between the needlepoint-shape end portion 1031 of the first tip structure 103 and the needlepoint-shape end portion 1041 of the second tip structure 104 is too far, and improves the discharging function of the touch panel circuit 110.

In some embodiments, the first tip structure 103 is formed when forming the signal transmission path 101 by, for example, an etching process, and the second tip structure 104 is formed when forming the ground path 102 by, for example, an etching process. This may reduce the cost of adding the electrostatic discharge protection device to a touch panel.

Figure 2:
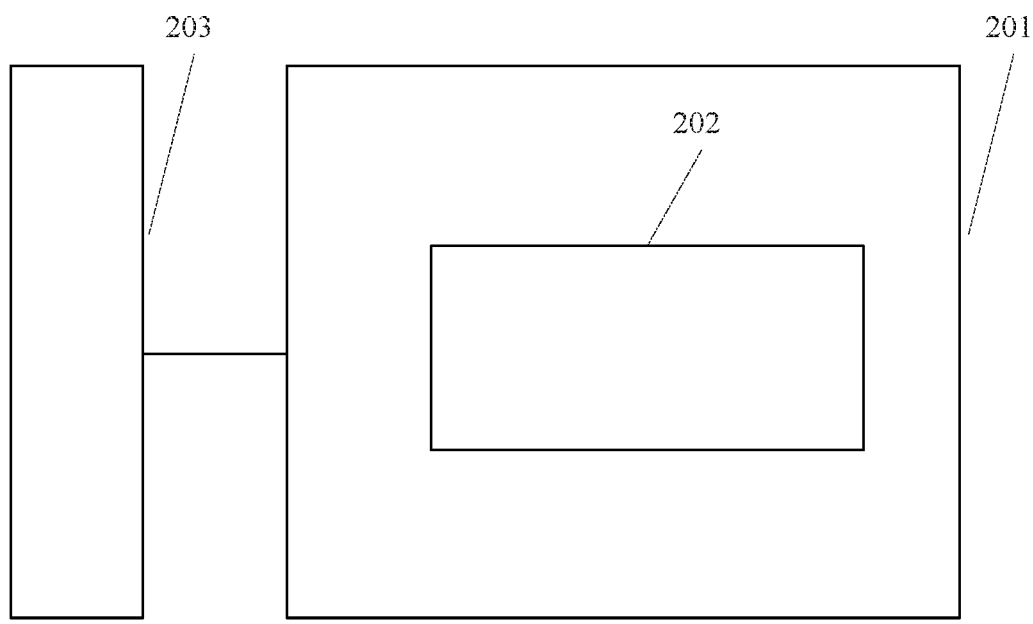
FIG. 2 is a block diagram of a device including the touch panel circuit, according to an exemplary embodiment of the present disclosure.

FIG. 2 is a block diagram of a device 200, according to an exemplary embodiment of the present disclosure. For example, the device 200 may be a mobile phone, a tablet computer, etc. The device 200 includes a touch panel 201 that further includes a touch panel circuit 202, and a touch panel control chip 203. For example, the touch panel 201 and the touch panel circuit 202 may be the touch panel 100 and the touch panel circuit 110 (FIG. 1), respectively. The touch panel control chip 203 is configured to control operation of the touch panel 201.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing from the scope thereof. It is intended that the scope of the invention only be limited by the appended claims.

What is claimed is:

1. A touch panel circuit, comprising a signal transmission path and a ground path, wherein:
   an end of the signal transmission path is provided with a first tip structure protruding outward and having a needlepoint-shape end portion;
   the ground path is provided with a second tip structure having a needlepoint-shape end portion which is opposite to the needlepoint-shape end portion of the first tip structure; and
   the needlepoint-shape end portion of the first tip structure of the signal transmission path is configured to aggregate electrostatic charges on the signal transmission path, and discharge the aggregated electrostatic charges to the second tip structure of the ground path opposite to the first tip structure,
   wherein the first tip structure is formed by etching when etching the signal transmission path, and the second tip structure is formed by etching when etching the ground path.

2. The touch panel circuit of claim 1, wherein the needlepoint-shape end portion of the second tip structure is configured to receive the electrostatic charges discharged by the needlepoint-shape end portion of the first tip structure, and guide the electrostatic charges to the ground path.

3. The touch panel circuit of claim 1, wherein a distance between the needlepoint-shape end portion of the first tip structure and the needlepoint-shape end portion of the second tip structure is smaller than a predetermined distance threshold.

4. The touch panel circuit of claim 1, wherein the ground path is configured to provide a charge-flowing loop for the electrostatic charges received by the second tip structure.

5. The touch panel circuit of claim 1, wherein the signal transmission path is coupled to a touch panel control chip to receive a capacitance value generated on a touch panel and carry a driving signal of the touch panel control chip.

6. A touch panel comprising a touch panel circuit, the touch panel circuit including a signal transmission path and a ground path, wherein:
   an end of the signal transmission path is provided with a first tip structure protruding outward and having a needlepoint-shape end portion;
   the ground path is provided with a second tip structure having a needlepoint-shape end portion which is opposite to the needlepoint-shape end portion of the first tip structure; and
   the needlepoint-shape end portion of the first tip structure of the signal transmission path is configured to aggregate electrostatic charges on the signal transmission path, and discharge the aggregated electrostatic charges to the second tip structure of the ground path opposite to the first tip structure,
   wherein the first tip structure is formed by etching when etching the signal transmission path, and the second tip structure is formed by etching when etching the ground path.

7. The touch panel of claim 6, wherein the needlepoint-shape end portion of the second tip structure is configured to receive the electrostatic charges discharged by the needlepoint-shape end portion of the first tip structure, and guide the electrostatic charges to the ground path.

8. The touch panel of claim 6, wherein a distance between the needlepoint-shape end portion of the first tip structure and the needlepoint-shape end portion of the second tip structure is smaller than a predetermined distance threshold.

9. The touch panel of claim 6, wherein the ground path is configured to provide a charge-flowing loop for the electrostatic charges received by the second tip structure.

10. The touch panel of claim 6, wherein the signal transmission path is coupled to a touch panel control chip to receive a capacitance value generated on the touch panel and carry a driving signal of the touch panel control chip.

11. A device, comprising:
a touch panel control chip; and
a touch panel including a touch panel circuit that further includes a signal transmission path and a ground path, wherein:
an end of the signal transmission path is provided with a first tip structure protruding outward and having a needlepoint-shape end portion;
the ground path is provided with a second tip structure having a needlepoint-shape end portion which is opposite to the needlepoint-shape end portion of the first tip structure; and
the needlepoint-shape end portion of the first tip structure of the signal transmission path is configured to aggregate electrostatic charges on the signal transmission path, and discharge the aggregated electrostatic charges to the second tip structure of the ground path opposite to the first tip structure,
wherein the first tip structure is formed by etching when etching the signal transmission path, and the second tip structure is formed by etching when etching the ground path.

12. The device of claim 11, wherein the needlepoint-shape end portion of the second tip structure is configured to receive the electrostatic charges discharged by the needlepoint-shape end portion of the first tip structure, and guide the electrostatic charges to the ground path.

13. The device of claim 11, wherein a distance between the needlepoint-shape end portion of the first tip structure and the needlepoint-shape end portion of the second tip structure is smaller than a predetermined distance threshold.

14. The device of claim 11, wherein the ground path is configured to provide a charge-flowing loop for the electrostatic charges received by the second tip structure.

15. The device of claim 11, wherein the signal transmission path is coupled to the touch panel control chip to receive a capacitance value generated on the touch panel and carry a driving signal of the touch panel control chip.

* * * * *